(12) United States Patent
Schlebusch et al.

(10) Patent No.: US 7,651,708 B2
(45) Date of Patent: Jan. 26, 2010

(54) METHOD OF PRODUCING AN ANIMAL FOOD PRODUCT WITH A CORE AND SHELL

(75) Inventors: Johannes P. Schlebusch, Thedinghausen (DE); Ute Wasserfuhr, Hodenhagen (DE); Emilie De Bezenac, Rotterdam (NL); Michael Brauss, Leicestershire (GB)

(73) Assignee: Mars, Inc., McLean, VA (US)

( * ) Notice: Subject to any disclaimer, the term of this patent is extended or adjusted under 35 U.S.C. 154(b) by 664 days.

(21) Appl. No.: 11/477,328

(22) Filed: Jun. 29, 2006

(65) Prior Publication Data

US 2007/0020355 A1    Jan. 25, 2007

(30) Foreign Application Priority Data

Jul. 22, 2005   (DE)   ........................ 10 2005 034 568
Feb. 2, 2006   (EP)   ................................. 06002117

(51) Int. Cl.
*A23L 1/00*   (2006.01)
*A23K 1/00*   (2006.01)

(52) U.S. Cl. ...................... 426/289; 426/656; 426/518; 426/523; 426/805

(58) Field of Classification Search ................. 426/289, 426/656, 805, 518, 523
See application file for complete search history.

(56) References Cited

U.S. PATENT DOCUMENTS

| | | | | |
|---|---|---|---|---|
| 3,119,691 A | * | 1/1964 | Ludington et al. | 426/99 |
| 3,808,340 A | * | 4/1974 | Palmer | 426/92 |
| 3,808,341 A | * | 4/1974 | Rongey et al. | 426/92 |
| 3,916,029 A | | 10/1975 | Hildebolt | |
| 4,006,266 A | * | 2/1977 | Bone et al. | 426/623 |
| 4,777,058 A | | 10/1988 | Chandler et al. | |
| 4,795,655 A | * | 1/1989 | Spiel et al. | 426/635 |
| 4,822,626 A | | 4/1989 | Spanier et al. | |
| 6,391,375 B1 | * | 5/2002 | Fone | 426/635 |

FOREIGN PATENT DOCUMENTS

| | | |
|---|---|---|
| DE | 23 37 291 C2 | 2/1974 |
| EP | 1 063 897 B1 | 11/2003 |
| EP | 1745703 A1 * | 1/2007 |
| FR | 74 27296 | 10/1975 |
| GB | 1441342 | 10/1975 |
| GB | 1441342 | 6/1976 |
| WO | WO 00/74496 | 12/2000 |
| WO | WO 02/52951 | 7/2002 |
| WO | WO-2006/127352 | 11/2006 |

\* cited by examiner

*Primary Examiner*—C. Sayala
(74) *Attorney, Agent, or Firm*—Fulbright & Jaworski LLP

(57) ABSTRACT

The present invention relates to a method of producing an animal food product with a core and a shell at least partially covering the core, in which the core starting material includes meat and/or meat-like components, water, oil and/or fat, vitamins, minerals, salts, antioxidising agents, dyes and/or preservatives, vegetable fibres, and other ingredients. The shell starting material includes vegetable and/or animal protein, cereal, starch and/or dextrin, blood plasma, water, cereal derivative and/or sugar or sugar derivative, and vitamins, minerals, salts, antioxidising agents, dyes and/or preservatives. The method includes the steps of: either producing core particles by mixing the core materials, baking the mixture thus obtained, conditioning, cutting into small pieces and conditioning again, or producing core particles by mixing the core materials, cold forming the mixture thus obtained and cutting it into small pieces, and then mixing the core particles with the components of the shell in a coating pan, baking or deep-frying and finally conditioning.

24 Claims, No Drawings

METHOD OF PRODUCING AN ANIMAL FOOD PRODUCT WITH A CORE AND SHELL

CROSS-REFERENCE TO RELATED APPLICATIONS

Not applicable.

TECHNICAL FIELD

The present invention relates to a method of producing an animal food product with a core and a shell at least partially covering the core. It is particularly preferred in this context for the core to have a soft meat-like texture, whereas the coating has a crispy and dry texture.

BACKGROUND OF THE INVENTION

Animal food products with a dual texture of this kind are well-known in the art. WO 02/052951 A1, for example, describes a co-extruded, dual-component animal food product with an outer component containing at least 60% cereal, and an inner cream-textured component that has water-soluble components in an aqueous phase, which form a stable emulsion with a lipid-free hydrocarbon phase.

WO 00/74496 A1 describes a pack of animal food product consisting of an outer dry shell and an inner moist core, the core and the shell being separated from one another by a moisture-resistant barrier layer.

FR 2265287 A discloses an animal food product comprising a filling which is completely surrounded by a cereal-containing expanded extrudate. The filling contains meat, sugar, vegetable materials and an effective amount of a mycostatic agent. The filling material has a moisture content of 15-40 percent by weight and a water activity ($a_w$) of 0.70-0.90.

Animal food products with a dual texture, namely a soft and moist core and a dry and allegedly crispy shell are thus known from the state of the art. It has, however, been found that none of the animal food products known so far does in fact provide a clear and lasting delimitation between the soft core and the harder shell. On the contrary, in the known animal food products, the transition between the soft core and the hard shell is more or less fluid; especially after a lengthy storage time, the texture of the two components becomes so similar that it is hardly possible to perceive a difference between the core and the shell. This is presumably due to a diffusion of the moisture from the core into the shell. The disappearance of the difference between the core and the shell also has a particular influence on the microbiological safety of the animal food product (especially when it has a high moisture content) and the oxidative stability of any fat components that might be contained in the material of the core.

U.S. Pat. No. 4,777,058 A discloses a method of producing an animal food composition which likewise possesses a soft core and a harder shell. That animal food composition is produced by first of all extruding the components of the shell through an annular die in the form of a continuous cavity. The components of the core are then extruded into a portion of the extruded shell after a certain time has passed, which must be sufficient for the shell to become solid enough to withstand the pressure of the core components injected.

EP 1063897 B1 discloses a pet or animal food product with a dual texture and a method of producing same. That pet or animal food product has a shell component which completely encloses an inner component. The production method is that of co-extrusion.

For the production of the animal food products described, the extrusion and in particular the co-extrusion of components in an extruder device for a wide variety of materials may, however, involve problems. For continuous and reliable production, it is necessary to set a particular viscosity of the materials to be extruded, such as by means of a particular choice of temperature, so that the materials can be fed through the extruder. In addition, it is necessary to ensure that the extrusion dies used do not become clogged, as can easily happen in particular when semi-solid materials are to be extruded which may optionally still contain some pieces of solid material.

It is the object of the present invention to provide a method of producing an animal food product with a core and a shell at least partially covering the core, with which the disadvantages of the prior art can be overcome. In particular, it is intended to provide a method which dispenses with the extrusion of components of the animal food product and makes it possible to produce the animal food product in an extremely simple manner. The animal food product should preserve a distinct difference in texture between the shell and the core over a long period, especially including when the packaging of the animal food product has been opened; it should guarantee microbiological safety even in the case of a high moisture content on the part of the core material and should exhibit oxidative stability for a core material with a high proportion of fat. The difference in texture between the core and the shell should be distinctly perceptible to the user.

BRIEF SUMMARY OF THE INVENTION

This object is achieved by a method of producing an animal food product with a core and a shell at least partially covering the core, wherein the core comprises
20-100 parts by weight meat and/or meat-like components,
0-30 parts by weight additional water,
0-25 parts by weight oil and/or fat,
0-15 parts by weight vitamins, minerals, salts, antioxidising agents, dyes and/or preservatives,
0-15 parts by weight vegetable fibres,
1-20 parts by weight humectants, and
0-8 parts by weight dried animal blood plasma,
and wherein the shell starting material comprises
20-90 parts by weight vegetable and/or animal protein
0-30 parts by weight cereal, starch and/or dextrin,
0-50 parts by weight blood plasma,
0-30 parts by weight water,
10-80 parts by weight cereal derivative and/or sugar or sugar derivative and
0-10 parts by weight vitamins, minerals, salts, antioxidising agents, dyes and/or preservatives,
either
(a1) producing core particles by mixing the core materials, baking the mixture thus obtained, conditioning, cutting into small pieces and conditioning again, or
(a2) producing core particles by mixing the core materials, cold forming the mixture thus obtained and cutting into small pieces, and then
mixing the core particles with the components of the shell in a coating pan, baking or deep-frying and then conditioning.

In this context, it is preferable for the baking temperature in step (a1) to be about 150 to 250° C. and/or for the baking temperature in step (b) to be about 150 to 250° C. and/or for the baking time to be about 1-20 minutes in each case, preferably about 2-15 minutes.

It is also proposed that the cold forming should be performed at room temperature.

It is preferred in this connection that the core starting material should comprise

- 50-75 parts by weight meat and/or meat-like components,
- 5-10 parts by weight additional water,
- 5-10 parts by weight oil and/or fat,
- 5-10 parts by weight vitamins, minerals, salts, antioxidising agents, dyes and/or preservatives,
- 5-10 parts by weight vegetable fibres,
- 5-15 parts by weight humectants, and
- 2-7 parts by weight dried animal blood plasma.

In a particularly preferred embodiment, the shell comprises 25-75 parts by weight of vegetable and/or animal protein and 3-25 parts by weight of water.

It is also proposed that the core should account for 20-70 parts by weight, the shell 30-80 parts by weight and finishing materials 0-10 parts by weight of the animal food product.

In one embodiment, oil and/or fat may be a stabilized poultry fat, stabilized sunflower oil, stabilized palm oil, stabilized beef suet and/or stabilized pork fat.

It is also preferred that the meat and/or the meat-like components should be selected from beef, pork, poultry, lamb and/or fish and should preferably comprise offal, preferably liver, and skin, preferably poultry skin, and meat meal, preferably poultry meal, greaves meal and/or fish meal.

The vegetable fibres may be cellulose fibres, and the vegetable protein may be wheat and/or maize gluten and/or rice protein.

It may be provided for the cereal derivative of the shell to be maize wax starch, starch with a high amylose content and/or rice meal, where the starch may be both gelatinized and ungelatinized.

It is particularly preferred that the sugar derivative in the shell should be glucose syrup or a maize starch saccharification product. The saccharification product preferably comprises 14.7% glucose, 12.3% maltose, 13.7% maltotriose and 59.3% polysaccharide.

Most preferably, the core is soft and substantially moist, and the shell hard and substantially dry.

It is likewise most preferable that the values for the water activity of the core and the shell should not differ by more than 0.1.

In this context, it is also proposed, as a preferred embodiment, that the water activity value ($a_w$ value) of the core should be 0.4-0.6.

In a further preferred embodiment, the $a_w$ values of the core and the shell are substantially equal.

It is preferred that no moisture barrier layer should form between the core and the shell.

The core:shell length to diameter aspect ratio in the halved product can be about 62:38 to 80:20.

One embodiment is characterized by the fact that the core has a diameter of about 2 to about 20 mm.

It is also proposed that the thickness of the shell should be about 0.5 to about 6 mm.

The shell should preferably cover the core completely.

The humectant can be glycerine.

Finally, it can be provided that the weight ratio of core:shell is about 50:50.

It has surprisingly been found that with the method according to the invention, an animal food product with a soft core and a harder shell can be produced in an extremely simple manner. In one alternative, the core particles are manufactured first by mixing the core materials, then baking the mixture thus obtained, conditioning, cutting into small pieces and conditioning again. In another alternative, the core particles are manufactured first by mixing the core materials, cold forming the mixture thus obtained and cutting into small pieces. The expression "cold forming" is intended here to mean forming a dough-like mass of the core materials at room temperature, in the process of which the individual core particle components are held together and combined—by press compaction for example. In the second alternative, no baking step at an elevated temperature is necessary.

The core particles prepared in accordance with either alternative can then simply be mixed with the liquid and solid components of the shell in a coating pan. After being thoroughly blended, the core particles with a shell are then baked and finally conditioned. With the method according to the invention, it is possible, in a simple manner, to manufacture an animal food product the shell of which can be kept crispy despite contact with the soft moist core. In particular, an animal food product is made available with which an animal can be provided at any time with fresh meat that does not perish, because of the crispy protective shell. In addition, an animal food product is made available which the animal finds tasty and interesting. For the animal's owner, an animal food product is made available which can be divided into portions cleanly and easily, does not require any excessive cleaning of bowls and other utensils, and does not produce any unpleasant odors.

With the method according to the invention, an animal food product is produced in which the difference between the texture of the core and that of the shell can be maintained for the animal food product of the invention over a long period of more than ten months, even if the sales package of the animal food product has already been opened. The core does not dry out, because it is protected by the shell.

Further benefits and features of the method according to the invention will become apparent from the following detailed description of preferred embodiments.

DETAILED DESCRIPTION OF THE INVENTION

First of all three preferred formulations for an animal food product are provided in the following. All the figures are parts by weight, except where otherwise indicated. The two formulations I and II relate to one alternative of the manufacturing process, in which the core materials are baked, whereas formulation III stands for a process in which the core starting materials are cold formed.

| Meat-containing core | | | |
|---|---|---|---|
| | Formulation | | |
| | I | II | III |
| Beef liver | 23.9 | 23.9 | 20.5 |
| Pork windpipes | 18 | 3 | 5 |
| Poultry skin | | 15 | |
| Pork greaves meal | 14.1 | | |
| Poultry meal | | 14.0 | 41.7 |
| Water | 9.0 | 9.0 | |
| Poultry fat | | 5.9 | 2.5 |
| Sunflower oil | 8.9 | 3.0 | |
| Vitamins, minerals antioxidising agents and preservatives | 8.0 | 8.0 | 8.6 |
| Vegetable fibres | 7.6 | 7.7 | 8.3 |
| Glycerine | 6.5 | 6.5 | 7.0 |
| Dried blood plasma (pork) | 4 | 4 | |
| Wheat gluten | | | 2.0 |
| Dried brewers' yeast | | | 4.4 |

| Shell component (a) | Formulation | | |
|---|---|---|---|
| | I | II | III |
| Poultry fine meal | 0.0 | 15.2 | 62.8 |
| Maize gluten | 30.0 | 22.4 | |
| Wheat gluten | 20.0 | 19.4 | |
| Maize wax starch | 0.0 | 3.0 | |
| Starch with high amylose content (pre-gelatinized) | 8.0 | 0.0 | |
| Rice meal | 2.0 | 0.0 | |

| Shell component (b) | Formulation | | |
|---|---|---|---|
| | I | II | III |
| Maize starch saccharification syrup | 16.0 | 30.0 | |
| Water | 24.0 | 0.0 | |
| Maize steeping liquid | 0.0 | 10.0 | |
| Blood plasma, liquid, porcine | | | 37.2 |

The term "maize steeping water" is used to describe a concentrated maize steeping water, such as is available, for example, under the trade name Solulys® Corn Steep Liquor. Maize steeping water is the water in which grains of maize are soaked before undergoing further treatment steps, as a result of which maize ingredients (proteins, carbohydrates, etc.) pass into the water.

The core materials and shell components used are preferably present in the following ratios: 20-70 parts by weight core materials, 30-80 parts by weight shell and, optionally, 0-10 parts by weight finishing materials.

An animal food product was produced as follows on the basis of each of the two formulations given above.

In a first alternative of the process, first of all, the soft core for the animal food product according to formulations I and II was produced. To do so, the frozen meat and/or the meat-like components were first diced and chopped. Then oil and/or fat and glycerine were mixed, and after that, the other functional solid ingredients of the core were added. The resulting mixture was ground and blended thoroughly. These tasks were performed at room temperature. The moisture content of the mixture obtained amounted to about 44% and the $a_w$ value was about 0.7-0.8. The mixture was then baked in an oven at a temperature of about 240° C. and, following that, conditioned, chopped small and conditioned again, after which it was finished—with a moisture content now of about 20 to 30% and an $a_w$ value of about 0.6—, so that it could now be provided with a shell. The term "conditioning" is used in the present application to mean cooling the baked products by applying ambient air.

In a second alternative version of the process, the first step was again to prepare a mixture of the core materials according to formulation III, as described above in the first process alternative. In contrast to the first alternative, however, the mixture was not baked in an oven, but was cold formed and then chopped small. The cold forming took place at room temperature and resulted in a dough-like mass of the core materials. The moisture content of the core particles thus obtained was likewise about 20 to 30% and the $a_w$ value was about 0.6.

The core particles obtained from each process alternative were mixed with the solid component (a) and the liquid component (b) (substantially maize starch saccharification syrup) of the shell in a coating pan (also known as dusting coating, pan coating or drum coating), as a result of which the core particles were provided with an appropriate shell coating. A person skilled in the art will be familiar with how to obtain the desired particle sizes and shell thicknesses by selecting suitable parameters and controlling the process accordingly. After that, the coated core particles were delivered to a drum sieve in order to remove any animal food particles which were too small or too large, and then passed through an oven at a temperature of about 240° C., following which they were conditioned. As a final step, a finishing powder and/or a finishing liquid can optionally be poured into a device for a final treatment, which is followed by further conditioning, intermediate storage and finally packaging of the animal food particles obtained. A final treatment (finishing) can be taken to mean, for example, applying a mixture of stabilized oil/fat with a liquid protein extract onto the baked product. Other possible forms of final treatment and how to perform them will be readily known to a person skilled in the art. The $a_w$ values of the core and shell of the finished animal food product lay in a range from 0.4-0.5, the moisture content being about 5-10%, based on the total weight of the food particles.

With the method described above, animal food particles in accordance with the invention are conceivable in a wide variety of shapes, such as in bean shapes, star shapes or spherical shapes. In addition, the surface of the shell can be modified in any way desired, such as by giving it a smooth or rough surface. It is also conceivable to have particles of the animal food product which are only partially provided with a shell, while a particular surface region of the core remains uncoated. The animal food product of the invention can be produced in a wide range of shell colors, depending on the shell materials used.

The animal food products produced in accordance with the formulations given above were examined in detail with regard to their stability towards oxygen and moisture, and also with regard to their $a_w$ balance. Excellent results were obtained in those studies. The difference in texture between the hard and crispy shell and the soft meat-like core was maintained over many months without the shell being softened significantly. The fats contained in the core and the meat materials were not oxidized and had still not perished after many months.

The animal food product of the invention can be used as food for a wide range of animals, preferably cats and dogs.

The features of the invention disclosed in the above description and in the claims can be essential to implementing the invention in its various embodiments both individually and in any combination.

What is claimed is:

1. A method of producing an animal food product with a core and a shell at least partially covering said core, the method comprises the steps of:
   providing a core starting material that comprises,
   20-100 parts by weight meat and/or meat components,
   0-30 parts by weight added water,
   0-25 parts by weight oil and/or fat,
   0-15 parts by weight vitamins, minerals, salts, antioxidising agents, dyes and/or preservatives,
   0-15 parts by weight vegetable fibres,
   1-20 parts by weight humectants, and
   0-8 parts by weight dried animal blood plasma;
   providing a shell starting material that comprises,
   20-90 parts by weight vegetable and/or animal protein
   0-30 parts by weight cereal, starch and/or dextrin, 0-50 parts by weight blood plasma,
0-30 parts by weight water
10-80 parts by weight cereal derivative and/or sugar or sugar derivative, and
0-10 parts by weight vitamins, minerals, salts, antioxidising agents, dyes and/or preservatives;
(a1) producing core particles by mixing the core starting materials at ambient temperature, baking the resulting mixture, cooling the mixture, cutting the mixture into small pieces and cooling the mixture a second time, or
(a2) producing core particles by mixing the starting core materials, forming a dough-like mass of the resulting mixture at room temperature and cutting the mixture into small pieces, and then
(b) mixing the prepared core particles with the components of the shell in a coating pan whereby providing the core particles with a shell coating, baking or deep-frying the shell coated core particles and cooling the food product; wherein the water activity value ($a_w$ value) of the animal food product is 0.4-0.6.

2. The process as claimed in claim 1, wherein the baking temperature in step (a1) is about 150 to 250° C. and/or the baking temperature in step (b) is about 150 to 250° C. and/or the baking time is about 1-20 minutes in each case.

3. The process as claimed in claim 2, wherein the baking time is about 2-15 minutes for each.

4. The process as claimed in claim 1, wherein the core starting material comprises:
50-75 parts by weight meat and/or meat components,
5-10 parts by weight added water,
5-10 parts by weight oil and/or fat,
5-10 parts by weight vitamins, minerals, salts, antioxidising agents, dyes and/or preservatives,
5-10 parts by weight vegetable fibres,
5-15 parts by weight humectants, and
2-7 parts by weight dried animal blood plasma.

5. The process as claimed in claim 1, wherein the shell comprises 25-75 parts by weight of vegetable and/or animal protein.

6. The process as claimed in claim 1, wherein the shell comprises 3-25 parts by weight of water.

7. The process as claimed in claim 1, wherein the core accounts for 20-70 parts by weight, the shell 30-80 parts by weight and finishing materials of oil or fat 0-10 parts by weight of the animal food product.

8. The process as claimed in claim 1, wherein oil and/or fat is selected from a group consisting of a poultry fat, sunflower oil, palm oil, beef suet and pork fat.

9. The process as claimed in claim 1, wherein the meat and/or the meat components are selected from a group consisting of beef, pork, poultry, lamb, fish, skin, and meat meal.

10. The process as claimed in claim 9, wherein the meat and/or the meat components are selected from a group consisting of offal, liver, poultry skin, and poultry meal, greaves meal and fish meal.

11. The process as claimed in claim 1, wherein the vegetable fibres are cellulose fibres.

12. The process as claimed in claim 1, wherein the vegetable protein is wheat and/or maize gluten and/or rice protein.

13. The process as claimed in claim 1, wherein the cereal derivative of the shell is maize wax starch, starch with a high amylose content and/or rice meal, where the starch may be both gelatinized and ungelatinized.

14. The process as claimed in claim 1, wherein the sugar derivative in the shell is glucose syrup or a maize starch saccharification product.

15. The process as claimed in claim 1, wherein in the animal food product obtained, the core is soft and substantially moist, while the shell is hard and substantially dry.

16. The process as claimed in claim 1, wherein the values for the water activity of the core and the shell do not differ by more than 0.1.

17. The process as claimed in claim 1, wherein the $a_w$ values of the core and the shell are substantially equal.

18. The process as claimed in claim 1, wherein no moisture barrier layer is formed between the core and the shell.

19. The process as claimed in claim 1, wherein in the animal food product obtained, the core:shell length to diameter aspect ratio in the halved product is about 62:38 to 80:20.

20. The process as claimed in claim 1, wherein the core has a diameter of about 2 to about 20 mm.

21. The process as claimed in claim 1, wherein the thickness of the shell is from about 0.5 to about 6 mm.

22. The process as claimed in claim 1, wherein the shell covers the core completely.

23. The process as claimed in claim 1, wherein the humectant is glycerine.

24. The process as claimed in claim 1, wherein the weight ratio of core:shell is about 50:50.

* * * * *

UNITED STATES PATENT AND TRADEMARK OFFICE
CERTIFICATE OF CORRECTION

PATENT NO. : 7,651,708 B2 Page 1 of 1
APPLICATION NO. : 11/477328
DATED : January 26, 2010
INVENTOR(S) : Schlebusch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Twenty-third Day of November, 2010

David J. Kappos
*Director of the United States Patent and Trademark Office*